(12) United States Patent
Yamada

(10) Patent No.: US 7,859,730 B2
(45) Date of Patent: Dec. 28, 2010

(54) PRINTER WITH SCANNER FUNCTION, AND ITS CONTROL METHOD AND CONTROL PROGRAM PRODUCT

(75) Inventor: Kazumi Yamada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1666 days.

(21) Appl. No.: 10/830,784

(22) Filed: Apr. 22, 2004

(65) Prior Publication Data

US 2005/0002045 A1    Jan. 6, 2005

(30) Foreign Application Priority Data

Apr. 25, 2003   (JP) .............................. 2003-122847

(51) Int. Cl.
   *G03F 3/08*   (2006.01)
(52) U.S. Cl. ...................... 358/521; 358/2.1; 358/3.02; 358/534
(58) Field of Classification Search .................. 706/20; 358/1.1–1.9, 1.11–1.18, 3.21–3.22, 521, 358/528, 3.12, 3.02, 3.09
See application file for complete search history.

(56) References Cited

U.S. PATENT DOCUMENTS 5,884,296 A * 3/1999 Nakamura et al. ............ 706/20
6,317,220 B1 * 11/2001 Fujita et al. ................. 358/3.12
6,466,335 B1 * 10/2002 Umezawa et al. ............ 358/1.9
2002/0126303 A1 * 9/2002 Yamada ....................... 358/1.9

FOREIGN PATENT DOCUMENTS

JP       2002-252781       9/2002

OTHER PUBLICATIONS

Abstract of Japanese Patent Publication No. 2002-252781, Pub. Date: Sep. 6, 2002, Patent Abstracts of Japan.

* cited by examiner

*Primary Examiner*—King Y Poon
*Assistant Examiner*—Lennin Rodriguez
(74) *Attorney, Agent, or Firm*—Martine Penilla & Gencarella, LLP

(57) ABSTRACT

When text is taken in with a scanner, the reflection of the light from a sheet of paper, etc. causes a tinge on the sheet of paper. The tinge around each letter is printed as minute dots, and the outlines of printed letters are blurred and the clearness or distinctness of the letters are decreased.

When printing text taken in through a scanner unit 30, by reducing (or reducing to zero) the ratios of occurrence of small dots in a gradient range "n" or "m" of the data for printing (CMYK signals) generated from image data (RGB signals), or converting such ratios of occurrence of small dots into the ratios of occurrence of large dots based on the weight ratio, the blur of each letter that may be caused by the small dots can be reduced, and the clearness and distinctness of each letter can be improved.

15 Claims, 19 Drawing Sheets

FIG. 6

| R | G | B | | C | M | Y | K |
|---|---|---|---|---|---|---|---|
| 0 | 0 | 0 | | C0 | M0 | Y0 | K0 |
| 0 | 0 | 0 | | C1 | M1 | Y1 | K1 |
| | | | | | | | |
| 255 | 255 | 254 | | C254 | M254 | Y254 | K254 |
| 255 | 255 | 255 | | C255 | M255 | Y255 | K255 |

Color-conversion table T1

$17^3$ reference points

FIG. 8

| Dot-conversion table T2 | | | | | | | | | |
|---|---|---|---|---|---|---|---|---|---|
| Ratios of occurrence of dots (%) | Small dots | 0 | S1 | S2 | ~ | Sn | ~ | ~ | 0 |
| | Medium dots | 0 | 0 | 0 | ~ | 0 | ~ | ~ | 0 |
| | Large dots | 0 | 0 | 0 | ~ | 0 | ~ | ~ | 100 |
| Gradient | | 0 | ~ | ~ | n | ~ | ~ | 255 |

256 gradients

FIG. 10

| Dot-conversion table T3 | | Gradient range "n" | | | | | |
|---|---|---|---|---|---|---|---|
| Ratios of occurrence of dots (%) | Small dots | 0 | Sn1 | Sn2 | ~ | Snn | ~ | 0 |
| | Medium dots | 0 | 0 | 0 | ~ | 0 | ~ | 0 |
| | Large dots | 0 | 0 | 0 | ~ | 0 | ~ | 100 |
| Gradient | | 0 | ~ | | n | ~ | | 255 |

256 gradients

FIG. 15

| Dot-conversion table T4 | | Gradient range "n" | |
|---|---|---|---|
| Ratios of occurrence of dots (%) | Small dots | o  o  o  ∼  o  ∼  ∼ | 0 |
| | Medium dots | o  o  o  ∼  o  ∼  ∼ | 0 |
| | Large dots | o  o  o  ∼  o  ∼  ∼ | 100 |
| Gradient | | o  ∼  ∼  n  ∼  ∼ | 255 |

256 gradients

FIG. 17

| Dot-conversion table T5 | Ratios of occurrence of dots (%) | Small dots | 0 | S1' | S2' | ... | Sm' | ... | 0 |
|---|---|---|---|---|---|---|---|---|---|
| | | Large dots | 0 | | | 0 | | | 100 |
| | Gradient | | 0 | | | m | | | 255 |

Gradient range "m" spans S1' to Sm'.
256 gradients total (0 to 255).

PRINTER WITH SCANNER FUNCTION, AND ITS CONTROL METHOD AND CONTROL PROGRAM PRODUCT

BACKGROUND OF THE INVENTION

1. Field of the Invention

This invention relates to a printer with a scanner function, which takes in images with its scanner function and prints out the images with its printer function, and its control method and control program product.

2. Description of the Prior Art

Printers with a scanner function currently on the market are not equipped with an image-processing engine for their simple structure. They take in image data (RGB signals) with their scanner functions, convert the image data as they are into data for printing (CMYK signals) based on a prescribed lookup table, and prints out the images with their printing functions.

On the other hand, there are available methods of taking text in with a scanner function and increasing clearness, or distinctness, of letters in printing them. According to one of those methods, letters are printed in distinct black, while the background of the letters is regarded as white. In this regard, a useful technique is known. According to the technique, while the RGB signals of image data taken in with a scanner function are converted into CMYK signals for printing, RGB signals within the vicinities of the values representing darkest red, green, and blue are converted into black (K)-100% signals and RGB signals within the vicinities of the values representing lightest red, green, and blue are converted into CMYK-0% signals (see, for example, Japanese Unexamined Patent Publication No. 2002-252781).

When text is taken in with a conventional printer with a scanner function and without the above clearness-improving function, the reflection of the light of its light source may cause a tinge around each letter. If it happens, the printer with a scanner function converts the image data as they are into data for printing and hence the tinge around each letter is printed as minute dots if the printer with a scanner function is capable of minute dots. Thus, the outlines of printed letters are blurred and the printed letters are rendered unclear. With a conventional printer with a scanner function and the above clearness-improving function, this problem can be avoided. However, the printer is capable of printing only in black and white, but incapable of printing in gradation.

SUMMARY OF THE INVENTION

In view of the above problem, the object of this invention is to provide a printer with a scanner function and its control method and control program product capable of preventing the outlines of letters from being blurred by minute dots and also capable of expression in gradation.

To achieve the above object, the present invention provides a printer with a scanner function printing images taken in by a scanner, comprising (i) an image data acquirer inputting image data composed of a set of prescribed elementary colors, (ii) a data converter converting the inputted image data into data for printing composed of the ratios of occurrence of dots of two or more dot sizes on the basis of the corresponding relationship between the gradational expression of the prescribed elementary colors and the ratios of occurrence of dots of the two or more dot sizes of another set of elementary colors for printing, and (iii) a relationship controller (a) changing the corresponding relationship in a gradient range where the ratios of occurrence of dots of a comparatively small dot size of the two or more dot sizes are below a prescribed threshold value and (b) reducing the ratios of occurrence of dots of the comparatively small dot size in the gradient range while the inputted image data are being converted into data for printing if the image data are inputted through the scanner by the image data acquirer and the image data are of a prescribed attribute.

The above printer with a scanner function prints out images as follows. The image data acquirer inputs image data composed of a set of prescribed elementary colors. Prescribed beforehand in the data converter is the corresponding relationship between the gradational expression of the elementary colors of the inputted image data and the ratios of occurrence of dots of two or more dot sizes of another set of elementary colors for printing. The data converter converts the image data inputted through the image data acquirer into data for printing composed of the ratios of occurrence of dots of two or more dot sizes on the basis of the corresponding relationship. Image data inputted through the image data acquirer may be image data based on the images taken in through the scanner, or image data transmitted from a host computer, or image data transmitted from a digital camera connected to the printer with a scanner function, or the like.

If the image of text is taken in through the scanner, the reflection of the light from the light source may cause a tinge around each letter. If this happens, ink dots of the comparatively small dot size are discharged to express the tinge of each letter and hence, the outline of each letter is blurred and the printed letter is rendered unclear. Accordingly, in the present invention, when an image of text of a certain attribute is taken in through the scanner, the ratios of occurrence of dots of the comparatively small dot size are reduced and, thus, the numbers of comparatively small ink dots of the prescribed elementary colors to be discharged to express the tinge of each letter are reduced. Thus, the blur of the letters are reduced, and the clearness or distinctness of the letters can be improved.

More specifically, if the image data inputted by the image data acquirer are to be taken in through the scanner and the image is of a certain attribute, the relationship controller changes the corresponding relationship in a gradient range where the ratios of occurrence of dots of the comparatively small dot size are below a prescribed threshold value and then the data converter converts the image data inputted by the image data acquirer into data for printing based on the changed corresponding relationship. Accordingly, the numbers of dots of the comparatively small dot size in the data for printing are reduced. Thus, the numbers of ink dots of the comparatively small dot size and the elementary colors to be discharged to express the tinge around each letter are reduced; therefore, the clearness or distinctness of each letter is improved. Besides, as the ratios of occurrence of dots of the comparatively small dot-size colors within the above gradient range alone are reduced, the various expression of gradation can be maintained outside the gradient range. Of course, ink dots of the comparatively small dot size may be of the smallest dot size or of two or more smaller dot sizes of several kinds of sizes.

The relation controller may reduce the ratios of occurrence of dots of the comparatively small dot size to "0" in a gradient range where the ratios are below a prescribed threshold value. Accordingly, the comparatively small ink dots are not discharged at all and hence the blur of the outline of each letter can be prevented completely.

The relationship controller may reduce the ratios of occurrence of dots of the comparatively small dot size in a gradient range where the ratios are below a prescribed threshold value by converting the ratios of occurrence of dots of the comparatively small dot size in the gradient range into the ratios of occurrence of dots of relatively large dot size. If the size of dots is large, the dots would not appear as blur; accordingly, the clearness or distinctness of letters would be maintained. The relation controller may convert the ratios of occurrence of dots of the comparatively small dot size into the ratios of occurrence of dots of relatively large dot size based on the weight ratio of a comparatively small dot to a large dot. If a comparatively small dot weighs 2 ng and a relatively large dot weighs 6 ng, they are in the weight ratio of 1:3; accordingly, the ratios of occurrence of comparatively small dots are divided by three and converted into ratios of occurrence of relatively large dots. With this technique, the blur of outlines of letters is prevented while the expression of gradation is maintained in the gradient range where the comparatively small dots are reduced.

The higher the density of blur of the outline of a letter is, the more conspicuous the blur is. Accordingly, if the elementary colors for printing include a light color and a deep color, the relationship controller may reduce the ratio of occurrence of the comparatively small deep-color dots. On the other hand, black blur would mar the clearness or distinctness of letters more than blur in other colors. Accordingly, if one of the elementary colors for printing is black, the relation controller may reduce the ratio of occurrence of the comparatively small black dots.

Moreover, an example of technique to increase the processing speed of conversion from image data into data for printing and the processing speed of change of the corresponding relationship is as follows. A look-up table, which prescribes the corresponding relationship between the elementary colors of image data and the elementary colors of data for printing, is stored in advance in a look-up-table-storing means. Then, the data converter reads out the look-up table and converts image data into data for printing. The relationship controller can change the corresponding relationship prescribed in the look-up table.

Of course, if the attribute of an image taken in is text, the present invention works effectively.

Besides, if a means of receiving instructions about such attributes is provided, instructions about such attributes can be received through the means.

Needless to say, the printer with a scanner function described above can be embodied as a control method which shows procedure for the printing of images taken in by the scanner function.

The control method comprises (i) a step of inputting image data composed of a set of prescribed elementary colors, (ii) a step of converting the inputted image data into data for printing composed of the ratios of occurrence of dots of two or more dot sizes on the basis of the corresponding relationship between the gradational expression of the prescribed elementary colors of the image data and the ratios of occurrence of dots of two or more dot sizes of another set of elementary colors for printing, and (iii) a step of (a) changing the corresponding relationship in a gradient range where the ratios of occurrence of dots of a comparatively small dot size are below a prescribed threshold value and (b) reducing the ratios of occurrence of dots of the comparatively small dot size in the gradient range while the inputted image data are being converted into data for printing if the image data are inputted through the scanner function and the image data are of a certain attribute.

The present invention is effective as not only a substantial printer with a scanner function but also a method of controlling a printer with a scanner function.

The printer with a scanner function and the method of controlling the printer with a scanner function may be materialized with the printer with a scanner function alone or built in other equipment and used. Thus, the idea of the present invention includes various embodiments including software and hardware. When the idea of the present invention is embodied as software to control a printer with a scanner function, the printer with a scanner function and a recording medium of the software fall into the scope of the present invention.

One example is a program product to materialize the function of a printer with a scanner function on a computer. The program product comprises (i) a function of inputting image data composed of a set of prescribed elementary colors, (ii) a function of receiving instructions about the attributes of images receiving an instruction as to whether the attribute of the image is text or not (iii) a function of converting the inputted image data into data for printing composed of the ratios of occurrence of dots of two or more dot sizes on the basis of the corresponding relationship between the gradational expression of the prescribed elementary colors and the ratios of occurrence of dots of the two or more dot sizes of another set of elementary colors for printing, and (iv) a function of (a) changing the corresponding relationship in a gradient range where the ratios of occurrence of dots of the comparatively small dot size of the two or more dot sizes are below a prescribed threshold value and (b) reducing the ratios of occurrence of dots of the comparatively small dot size in the gradient range while the inputted image data are being converted into data for printing if the image data are inputted through the scanner function and the image data are of a certain attribute.

Thus, the present invention may be embodied as a program which runs on a computer. Of course, the software may be stored in a magnetic recording medium, an optical magnetic recording medium, or any new media to be developed in future.

The same holds true of the stage of copying the program including primary and secondary copies of the program. The program may be supplied through a communication network or through the medium of a semiconductor chip. Moreover, the idea of the present invention may be embodied as partially software and partially hardware. Part of the program may be stored in a recording medium and read in as the occasion demands.

BRIEF DESCRIPTION OF THE DRAWINGS

FIG. 6 is a color-conversion table;

FIG. 8 is a dot-conversion table made based on the graph of FIG. 7;

FIG. 10 is a dot-conversion table made based on the graph of FIG. 9;

FIG. 15 is a dot-conversion table made based on the graph of FIG. 14;

FIG. 17 is an ordinary dot-conversion table for a system of small and large dots;

DESCRIPTION OF THE PREFERRED EMBODIMENTS

The preferred embodiments of the present invention are described in the following order.
(1) Construction of printer with scanner function
(2) Processing of printing
(3) Modification 1
(4) Modification 2
(5) Conclusion

(1) Construction of Printer with Scanner Function

Figure 1:
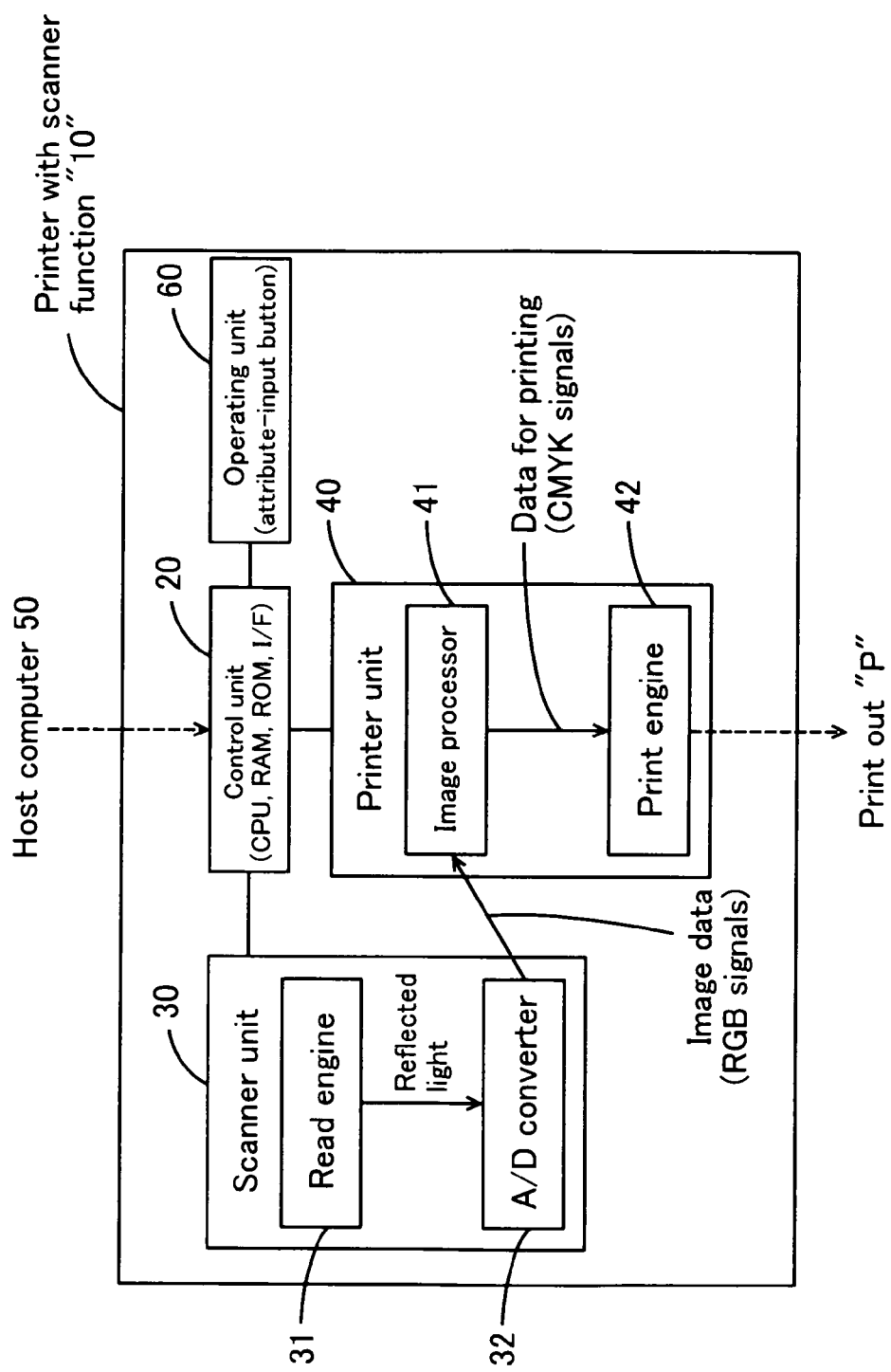
FIG. 1 shows the construction of an embodiment of the printer with a scanner function in accordance with the present invention.

FIG. 1 is a block diagram of a preferred embodiment of the printer with a scanner function according to the present invention.

The printer with a scanner function 10 comprises a control unit 20 (consisting of a CPU, a RAM, a ROM, various I/Fs, etc.) to control the processing by the printer with a scanner function 10, a scanner unit 30 to take in text or an image and convert them into image data (RGB signals, R: red, G: green, B: blue), a printer unit 40 to convert the image data (RGB signals) into data for printing (CMYK signals) corresponding to the inks (C: cyan, M: magenta, Y: yellow, K black) to be used for printing and print out the text or image, and an operating unit 60. The printer with a scanner function 10 can print images with the printer unit 40 based on the data for printing (CMYK signals) generated from the image data (RGB signals) corresponding to the images taken in by the scanner unit 30 and also can receive data for printing (RGB signals) from a host computer 50 connected to the control unit 20 and print images with the printer unit 40 based on the data for printing.

The scanner unit 30 comprises a light source (not shown), lenses (not shown), a scan motor (not shown), a CCD (complementary metal-oxide semiconductor) sensor, etc. and is provided with a read engine 31 and an A/D converter 32. The read engine 31 directs the light of the light source to text or an image, scans the text or image, and directs the reflected light to the CCD sensor with RGB filters. The A/D converter 32 converts the RGB analog signals from the CCD sensor into digital signals. For the reading by the scanner unit 30, a flat-bed system or a sheet-feed system can be adopted without limitation to them.

The printer unit 40 has an image processor 41 and a print engine 42. The image processor 41 refers to a color-conversion table and a dot-conversion table stored in a ROM or hard disk (not shown) and converts the image data of RGB signals into data for printing of CMYK signals. The printer with a scanner function 10 of the present embodiment prints out images by discharging the particles (small, medium, and large dot sizes) of CMYK inks. The above data for printing are composed of the ratios of occurrence of small, medium, and large dot sizes of CMYK inks. The data for printing undergoes image processing such as half-tone processing to become data (CMYK signals) printable by the print engine 42. The print engine 42 prints an image based on the data for printing prepared by the image processor 41 onto a medium (ordinary paper, bond paper, etc.) chosen by the operating unit 60 and discharges a printout "p".

An ink-jet system, a laser system, or the like may be adopted for the printing at the print engine 42. Inks for the printing by the printer with a scanner function 10 are not limited to CMYK inks. CMYKlclm inks may be used, "lc" and "lm" standing for "light cyan" and "light magenta," respectively. In this case, data for printing are composed of the ratios of occurrence of small, medium, and large dots of CMYKlclm inks. The printer with a scanner function 10 may be capable of handling small and large dots instead of small, medium, and large dots.

The operating unit 60 is connected to the control unit 20. The control unit 20 controls the printing in accordance with the instructions from the operating unit 60. The operating unit 60 is provided on its operating surface (not shown) with a copy-mode button, a button to input the number of copies, a button to choose the attributes (image, text, or the mixture of image and text) of images to be taken in, a button to choose a medium for printing, and so on. The user realizes desired printing functions with the printer with a scanner function 10 by operating these buttons. For example, if the copy-mode button is chosen by the operating unit 60, the control unit 20 controls the scanner unit 30 to make it take in an image fed by the user and controls the printer unit 40 to make it print out an image, in the form of a printout "P", based on the image data from the scanner unit 30. On the other hand, if the copy-mode button is not chosen, when the image data from the host computer 50 is inputted, the printer unit 40 makes it print out as an image, in the form of a print out "P," based on the inputted image data. As described above, a means of receiving instructions about the attributes of images to be taken in is constructed of the attribute-input button, a hardware circuit connected to the attribute-input button, and a hardware circuit and software processing for the control unit 20 to acquire the operating situation of the attribute-input button.

Although the conversion from image data (RGB signals) into data for printing (CMYK signals) is explained in this embodiment, the color combination of data for printing is not limited to CMYK. For example, RGB signals may be converted into CMYKlclm signals. RGB of the present embodiment corresponds to a set of prescribed elementary colors of the present invention and CMYK of the present embodiment corresponds to another set of prescribed elementary colors of the present invention. Therefore, the image data of the present embodiment correspond to the image data expressed in gradation in the prescribed elementary colors of the present invention and data for printing of the present embodiment correspond to image data expressed in gradation by the ratios of occurrence of dots of two or more dot sizes of the present invention. The control unit 20 and the scanner unit 30 of the present embodiment constitute the image data acquirer of the present invention. The image processor 41 of the printer unit 40 of the present embodiment constitutes the data converter and the relation controller of the present invention. The print engine 42 of the present embodiment constitutes the means of outputting image data of the present invention.

Figure 2:
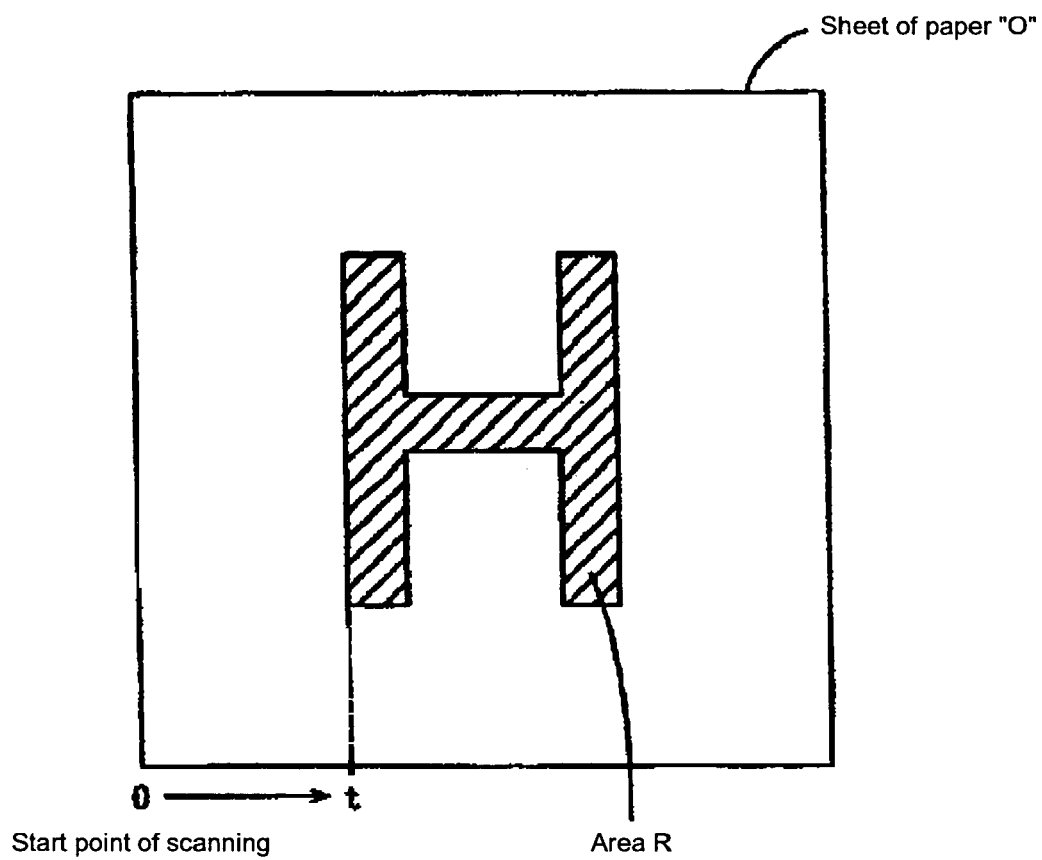
FIG. 2 is an example of a sheet of paper bearing a letter.
Figure 3:
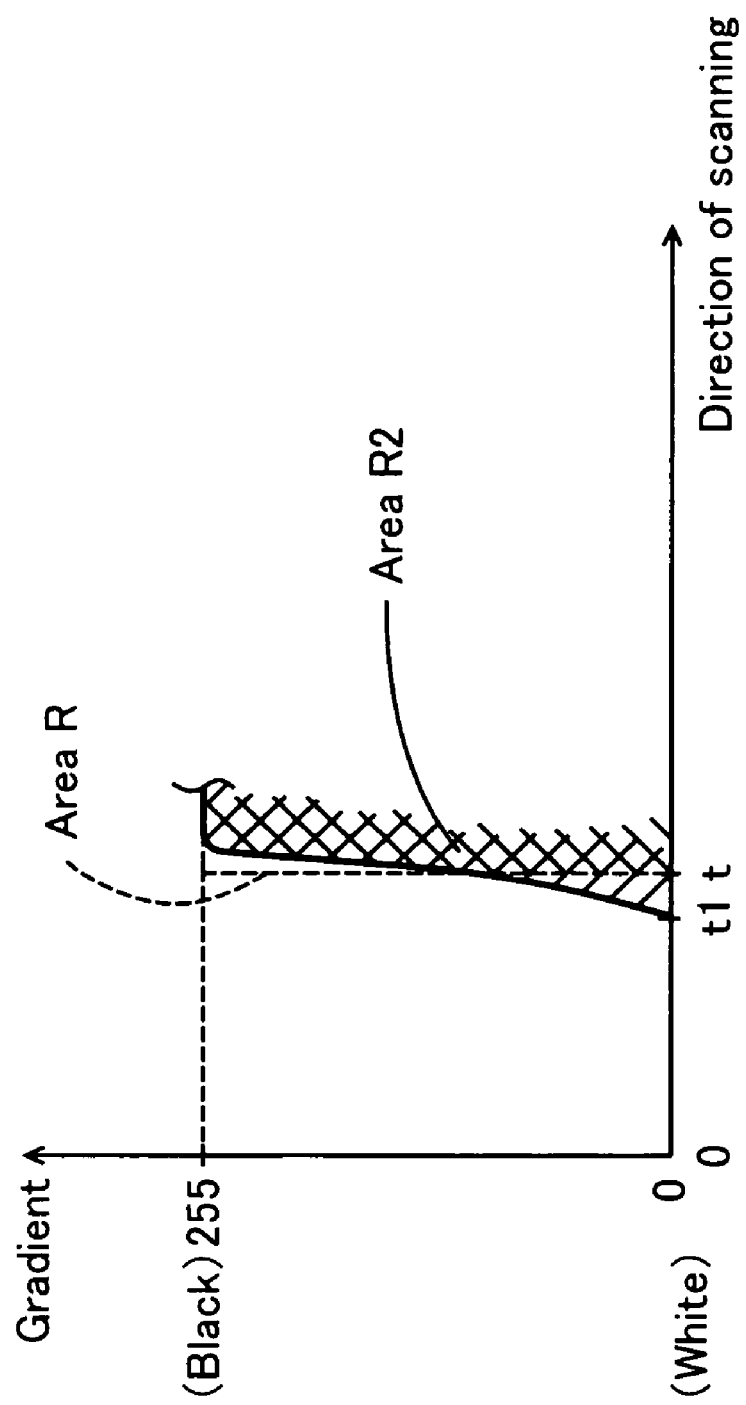
FIG. 3 is an illustration of the buildup of the gradient when the sheet of paper of FIG. 2 is scanned by the scanner unit of a printer with a scanner function of prior art.

FIG. 2 shows a sheet of white paper "O" where a letter occupies an area "R". When the sheet is scanned from the start point of scanning "0", the taking in of the area "R" starts at the point "t". If the area "R" is black, the gradient of the image data changes from 0 (white) to 255 (black) at the point "t" substantially as shown in FIG. 3. However, because of the reflection of the light of the light source caused by the sheet, the gradient starts to rise at a point "t1" a little before the point "t". Thus, the letter is represented by the area R2 in its image data.

Figure 4:
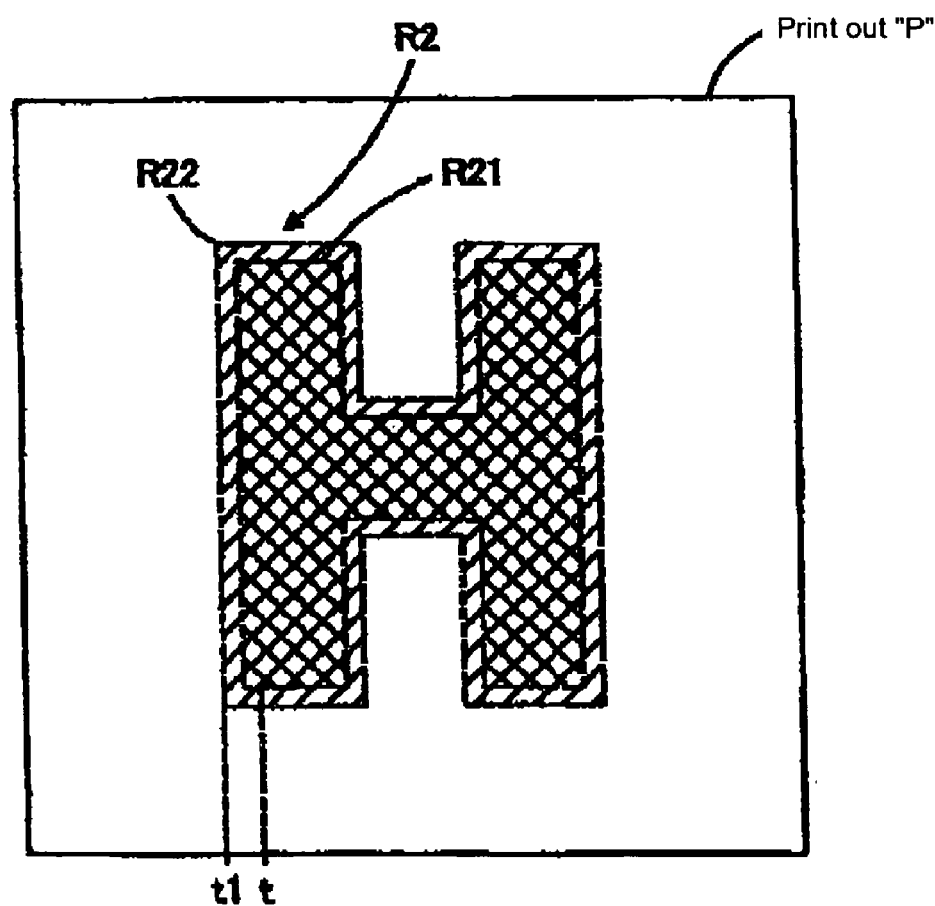
FIG. 4 is an illustration of a printout from the printer with a scanner function of prior art, the outline of the letter blurred.

In this case, small dots of black ink are discharged in the low-gradient zone. Accordingly, a zone R22 is formed around the area R21 (the letter) in the area R2 as shown in FIG. 4. The zone R22 is gray and the outline of the letter (R21) is blurred.

In this embodiment, the discharge of small dots of black ink in the area R22 is held down by holding down the ratios of occurrence of small dots in a certain gradient range (for example, a gradient range formed between the points "t1" and "t") when the sheet of paper "O" is scanned by the scanner unit 30. Thus, the blur of letters is reduced and the clearness or distinctness of letters is improved.

Specifically, when the copy-mode button is chosen at the operating unit 60, text is chosen by the attribute-input button, and the control unit 20 is notified of the chosen attribute, the occurrence of small dots is held down in a gradient range where the ratios of occurrence of small dots are below a threshold value and the image data are converted into data for printing by the image processor 41. Thus, data for printing, wherein the occurrence of small dots is held down, are made. Accordingly, the discharge of small ink dots around the letter is reduced and hence the clearness or distinctness of the printed letter is improved. Besides, as the ratios of occurrence of small dots can be reduced within a certain gradient range alone, the gradation outside the gradient range can be maintained in the image data and hence the gradation outside the gradient range can be printed.

(2) Processing of Printing

Figure 5:
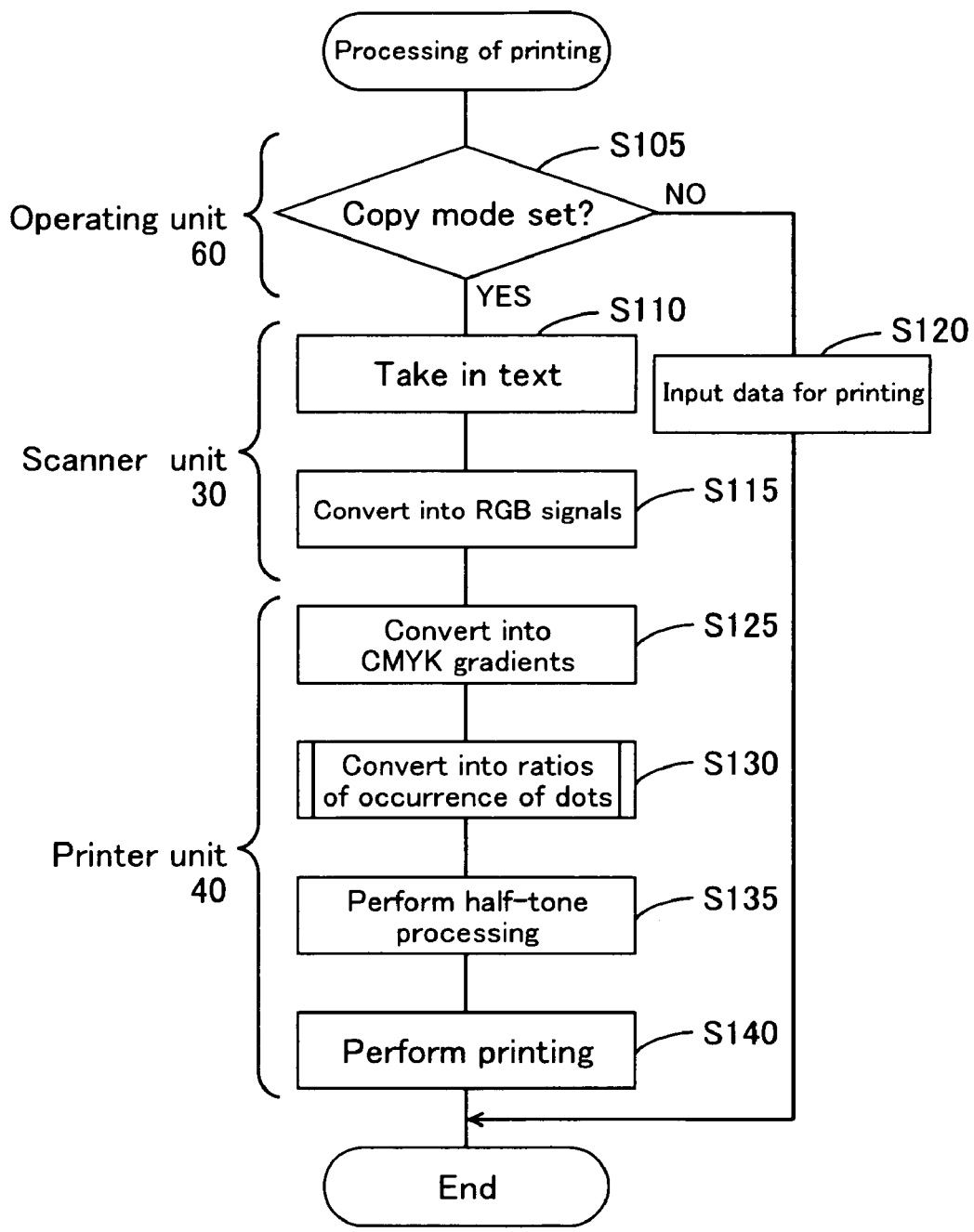
FIG. 5 is a flowchart of the processing of the printer with a scanner function of FIG. 1.

FIG. 5 is a flowchart of the processing by the printer with a scanner function 10 according to the present invention.

In Step S105, it is determined whether the copy-mode button is chosen at the operating unit 60 or not. If the copy-mode button is chosen, the control unit 20 controls the scanner unit 30 to take in an image (Step S110) and convert the image into image data of RGB signals in Step S115. If the copy-mode button is not chosen, the printer with a scanner function 10 receives data for printing from the host computer 50 (Step S120). If the scanner unit 30 produces image data of RGB signals, data for printing of CMYK signals are prepared from the image data.

Figure 7:
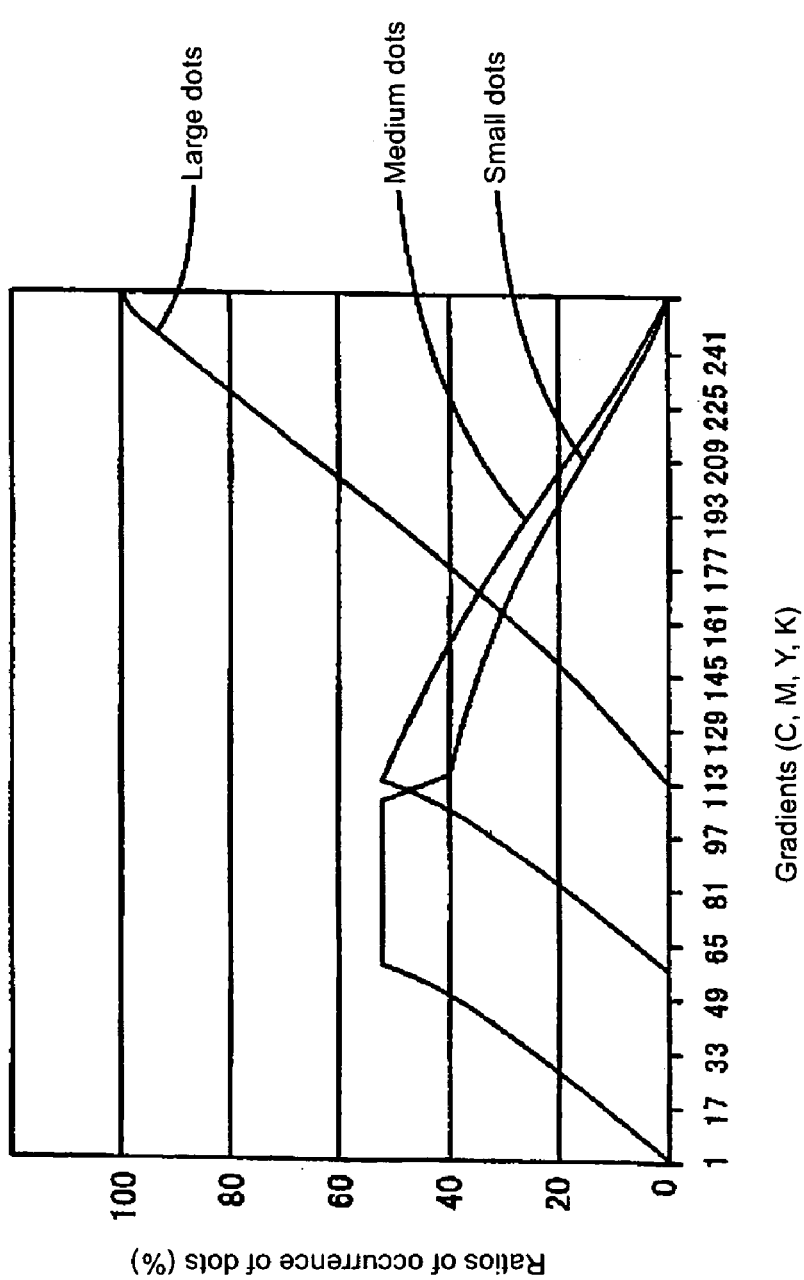
FIG. 7 is a graph showing the ordinary relations between the gradient and the ratios of occurrence of small, medium, and large dots of CMYK colors.

FIG. 6 is a color-conversion table T1 to convert RGB gradients in to CMYK gradients. RGB gradients and CMYK gradients are prescribed at $17^3$ reference points in the color-conversion table T1. RGB gradients corresponding to the reference points are converted into the corresponding CMYK gradients, and RGB gradients not corresponding to the reference points are converted into the CMYK gradients by interpolation (Step S125). Then, the ratios of occurrence of CMYK ink dots are determined based on the CMYK gradients. As shown in FIG. 7, the curves of occurrence of small, medium, and large dots are prescribed beforehand. FIG. 8 is a dot-conversion table T2 prepared based on the curves of FIG. 7.

Software processing in Steps S110 and S115 and hardware materializing the software processing constitute the image data acquirer (the step to input image data and the function of inputting image data). Software processing in Steps S125 and S130 and hardware materializing the software processing constitute the data converter (the step to convert data and the function of converting data).

The ratios of occurrence of small, medium, and large dots are prescribed at each of the 256 gradients (0-255). Accordingly, the ratios of occurrence of small, medium, and large dots of CMYK are determined from the gradients of CMYK acquired on the basis of the color-conversion table T1 and the gradients of CMYK are converted into the ratios of occurrence of small, medium, and large dots of CMYK (Step S130). Half-tone processing is done to the image data in the form of the ratios of occurrence of small, medium, and large dots of CMYK to produce data for printing (Step S135) and the print engine 42 prints out the image (Step S140). The color-conversion table T1 to convert RGB gradients to CMYK gradients and the dot-conversion table T2 to convert the gradients of CMYK into the ratios of occurrence of small, medium, and large dots of CMYK constitute the look-up tables of the present invention.

Figure 9:
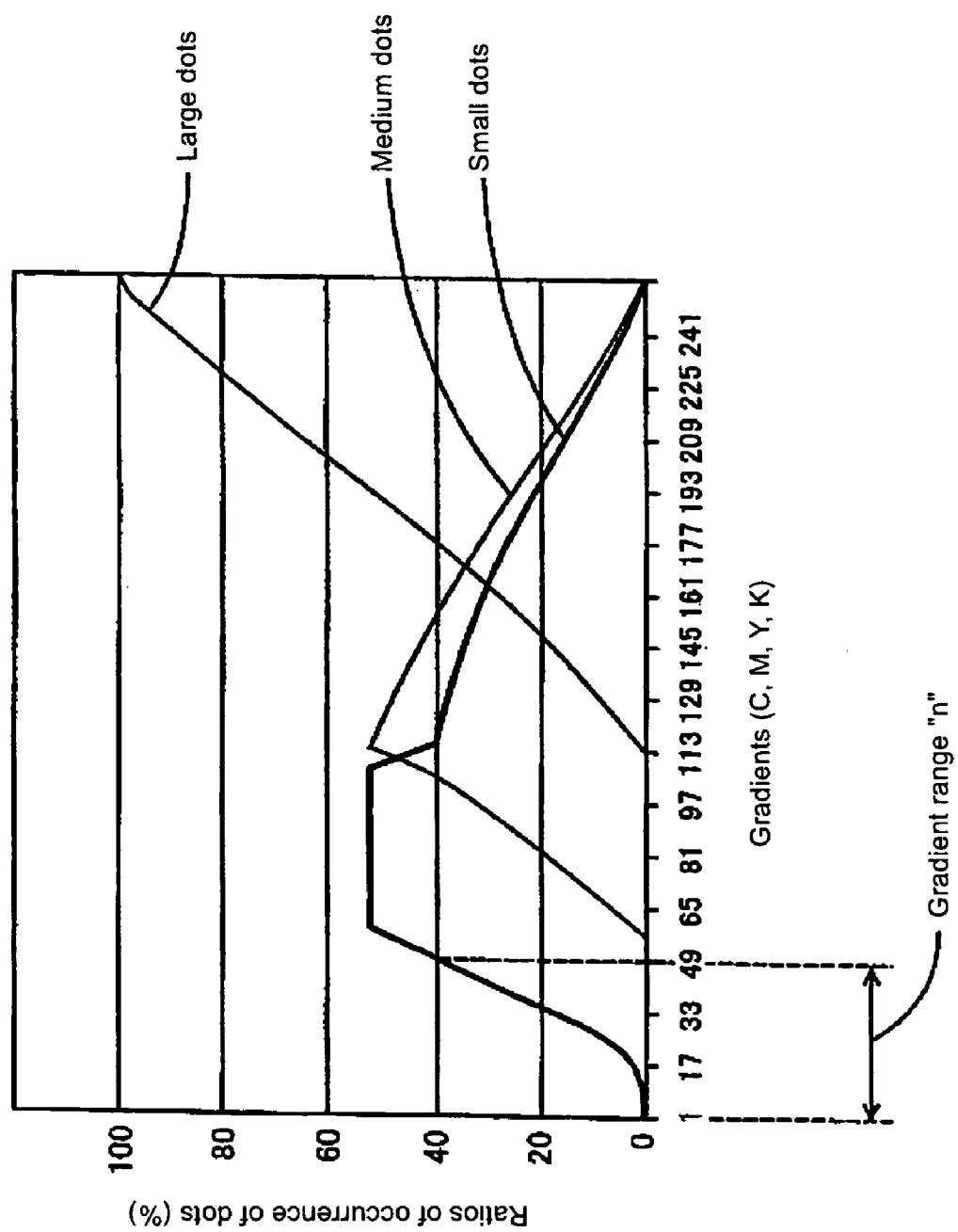
FIG. 9 shows the same graph as FIG. 7 except for the gradient range "n" wherein the ratios of occurrence of small dots are reduced in accordance with the present invention.

The above blur of letters occurs in a gradient range where the ratios of occurrence of small dots are low. Although the small dots here are the smallest dots, the size of the small dots corresponds to the comparatively small dot size of the present invention. Accordingly, in this embodiment, a gradient range of low ratios of occurrence of small dots is prescribed beforehand and the ratios of occurrence of small dots in the prescribed gradient range are reduced. FIG. 9 shows the patterns of ratios of occurrence of small, medium, and large dots, wherein the ratios of occurrence of small dots in a prescribed gradient range "n" are reduced. The dot-conversion table T3 shown in FIG. 10 is prepared based on the patterns of FIG. 9. Thus, in the gradient range "n", the ratios of occurrence of small dots S1% to Sn% in the dot-conversion table T2 are reduced to Sn1% to Snn% in the dot-conversion table T3.

Figure 11:
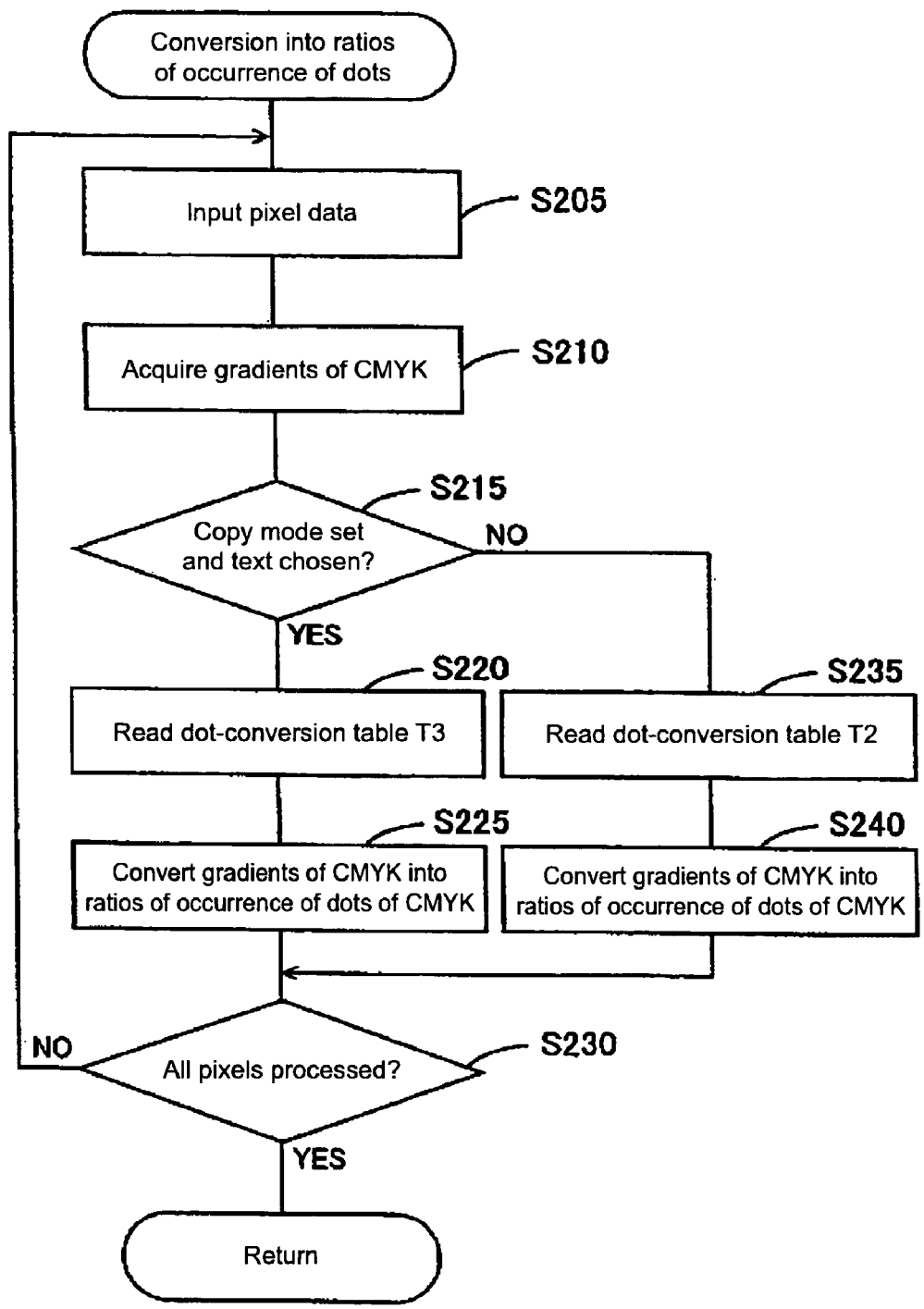
FIG. 11 is a flowchart of conversion from the gradients of CMYK into the ratios of occurrence of small, medium, large dots of CMYK in accordance with the present invention.

FIG. 11 is a flowchart of conversion from the gradients of CMYK into the ratios of occurrence of small, medium, large dots of CMYK.

First, based on the color-conversion table T1, the pixel data of image data in CMYK colors are inputted (Step S205) and the gradients of CMYK are acquired from the pixel data (Step S210). Then, it is ascertained whether the copy mode is chosen or not and whether text is chosen as the attribute or not (Step S215). When it is ascertained that the copy-mode button is chosen and text is chosen as the attribute by the attribute-input button, the dot-conversion table T3 is read out (Step S220).

Figure 12:
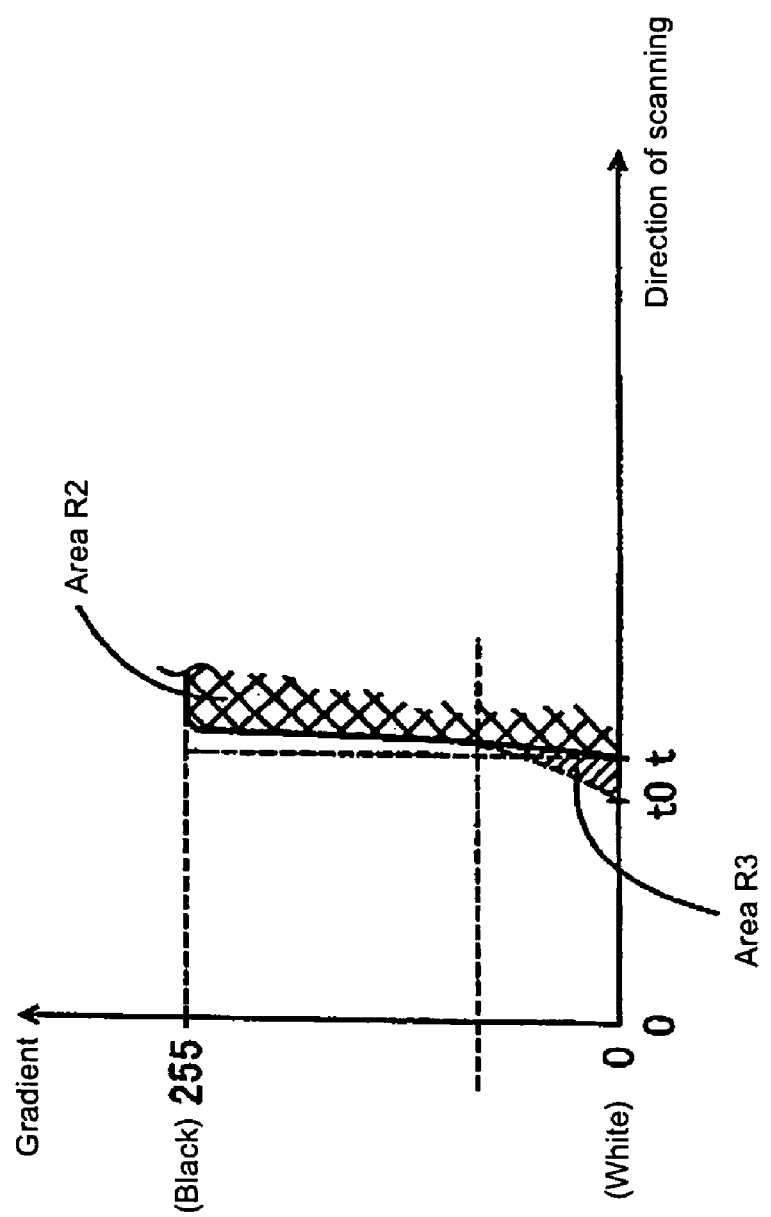
FIG. 12 is an illustration of the buildup of the gradient when the sheet of paper of FIG. 2 is scanned by the scanner unit of the printer with a scanner function of FIG. 1, and the numbers of small ink dots of CMYK in the area R3 are reduced.

Based on the dot-conversion table T3, the gradients of CMYK are converted into the ratios of occurrence of small, medium, and large dots of CMYK (Step S225). By doing the above processing to all the pixels, the pixel data of the gradients of CMYK are converted into the pixel data of the ratios of occurrence of small, medium, and large dots (Step S230). When it is ascertained that the copy-mode button is not chosen or text is not chosen as the attribute by the attribute-input button, the dot-conversion table T2 is read out (Step S235) and the gradients of CMYK are converted into the ratios of occurrence of small, medium, and large dots of CMYK based on the dot-conversion table T2 (Step S240). Accordingly, inks are not discharged in the area R3 between the points "t0" and "t" as shown in FIG. 12 and the letter is represented by the area R2. Thus, the letter represented by the area R2 is not blurred, and the clearness or distinctness of the letter can be improved as in FIG. 13.

The above software processing in Steps S220 and S225 and hardware materializing the software processing constitute the relationship controller (the control step and the control function) of the present invention.

(3) Modification 1

Figure 14:
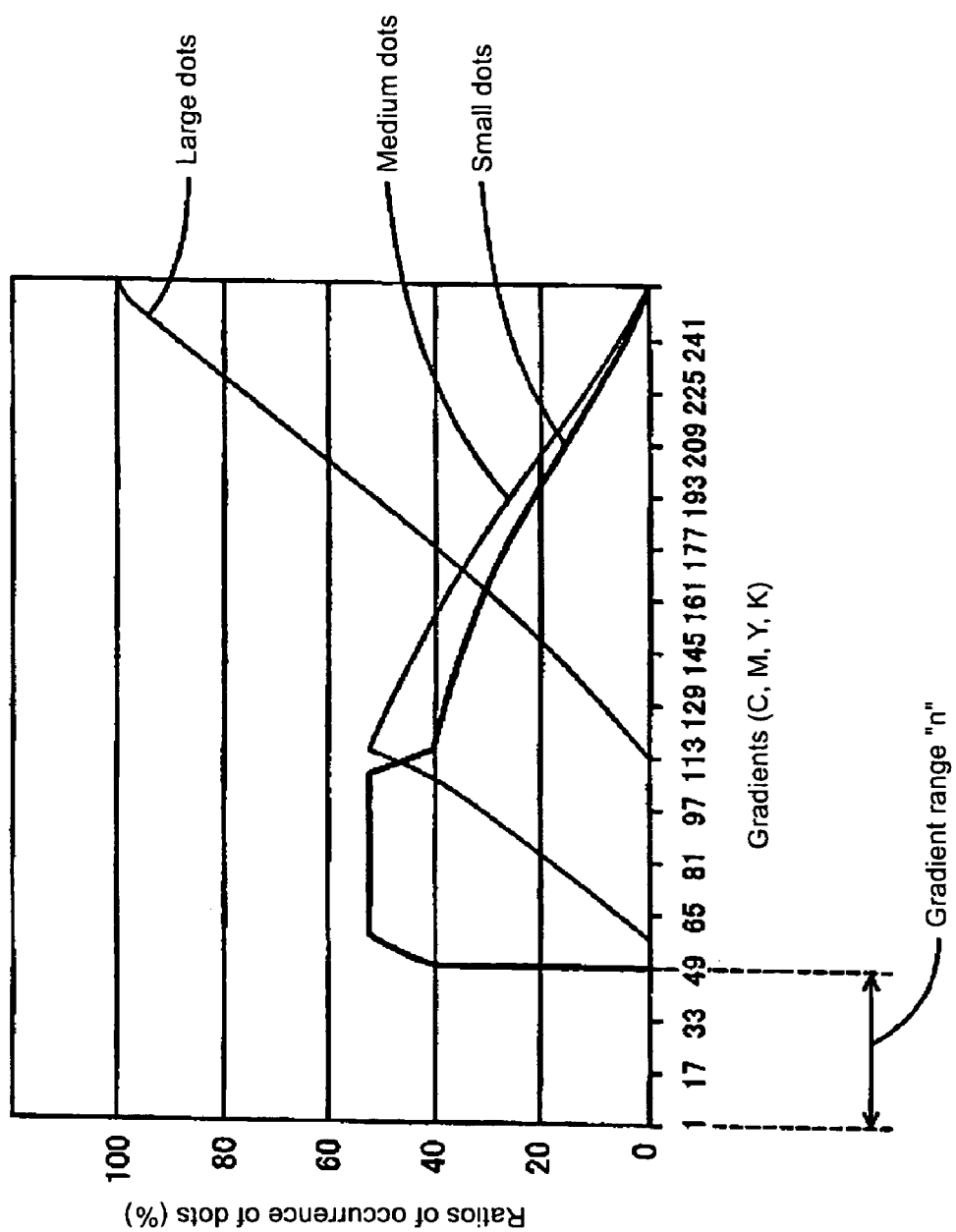
FIG. 14 shows the same graph as FIG. 7 except for the gradient range "n" wherein the ratios of occurrence of small dots of CMYK are reduced to zero in accordance with the present invention.

According to the above embodiment, the blur of letters is held down by reducing the ratios of occurrence of small dots in a certain gradient range. Of course, the technique to prevent the blur of letters is not limited to the method of the above embodiment. FIG. 14 shows another method, by which the ratios of occurrence of small dots are reduced to "0" in a gradient range "n". This method is preferable, because small dots do not occur at all and the blur of letters are prevented completely. FIG. 15 is a dot-conversion table T4 prepared on the basis of the patterns of FIG. 14. As shown in the dot-conversion table T4, the ratios of occurrence of small dots in the gradient range "n" are reduced to "0". In this case, the dot-conversion table T4 is readout in Step S220 and the gradients of CMYK are converted into the ratios of occurrence of small, medium, and large dots of CMYK in Step S225 of the flowchart of FIG. 11.

Figure 16:
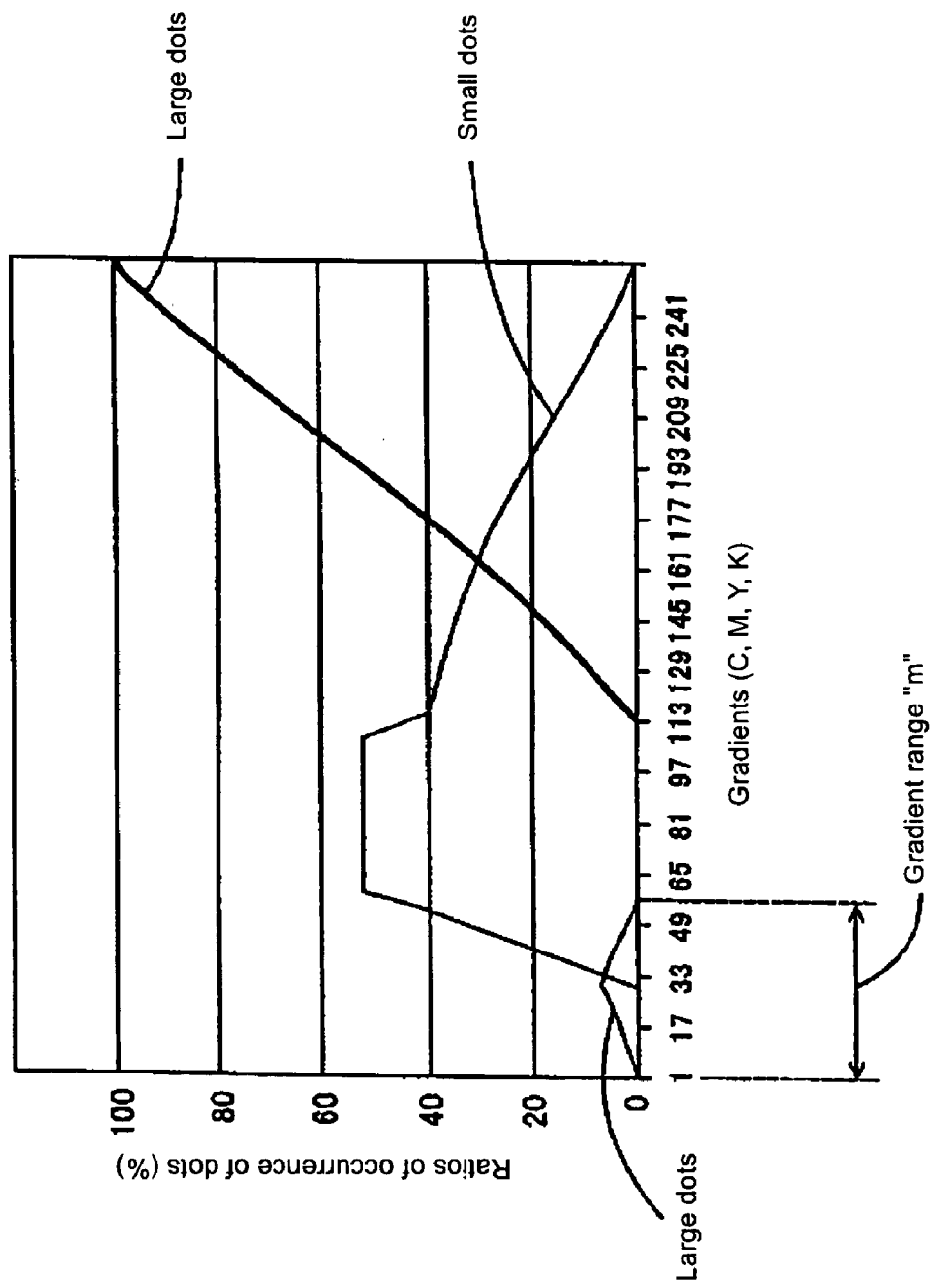
FIG. 16 is a graph showing the relations between the gradient and the ratios of occurrence of small and large dots of CMYK in which the ratios of occurrence of small dots are converted into the ratios of occurrence of large dots.

According to still another embodiment of the present invention, the printer unit 40 handles two dot sizes, small and large, and the gradation is maintained while small dots are reduced by converting the ratios of occurrence of small dots into ratios of occurrence of relatively large dots. It is preferable to make the conversion based on the weight ratio of a small dot to a large dot. If a small dot weighs 2 ng and the large one weighs 6 ng, they are in the weight ratio of 1:3; accordingly, the ratios of occurrence of small dots are divided by three and converted into ratios of occurrence of large dots. With this technique, the blur of outlines of letters is prevented while the expression of gradation is maintained in the gradient range where the numbers of small dots are reduced. FIG. 16 shows the patterns of ratios of occurrence of small and large dots. In a gradient range "m", the ratios of occurrence of small dots are converted into ratios of occurrence of large dots. FIG. 17 shows a dot-conversion table T5 which prescribes the ordinary ratios of occurrence of small and large dots before conversion.

Figure 18:
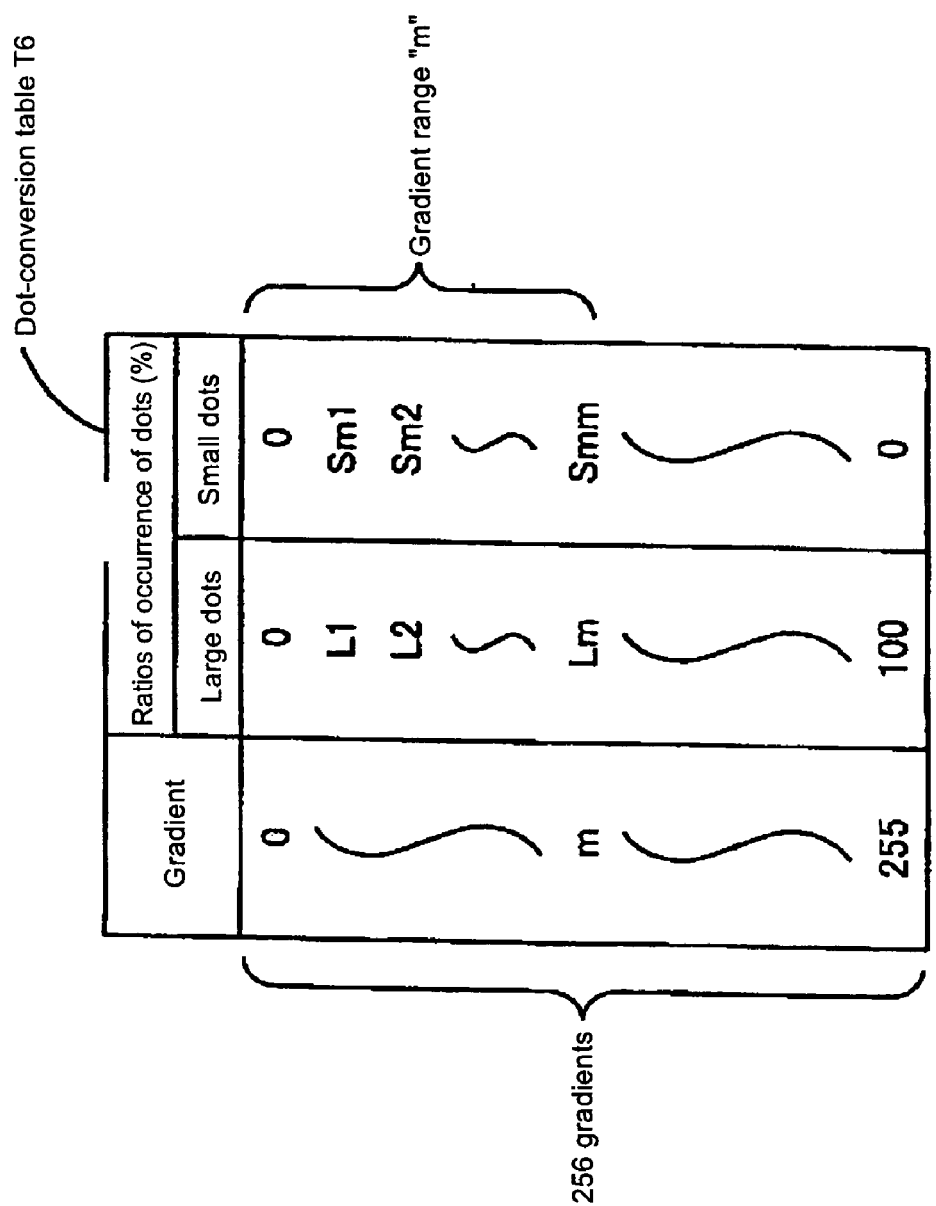
FIG. 18 is a dot-conversion table to convert the ratios of occurrence of small dots into the ratios of occurrence of large dots in a system of small and large dots in accordance with the present invention.

In the dot-conversion table T5, the ratios of occurrence of large dots are prescribed to be 0% in the gradient range "m" while the ratios of occurrence of small dots are prescribed to be 0%, S1'%, ..., Sm'%. FIG. 18 is a dot-conversion table T6 after conversion, wherein the ratios of occurrence of small dots in the gradient range "m" are changed to 0%, Sm1%, ..., Smm %; accordingly, the ratios of occurrence of large dots are changed to 0%, L1%, ..., Lm %. In this case, the dot-conversion table T6 is read out in Step S220 of FIG. 11 and the gradients of CMYK are converted into the ratios of occurrence of small and large dots of CMYK in Step S225. Also, in Step S235, the dot-conversion table T5 is read out and the gradients of CMYK are converted into the ratios of occurrence of small and large dots of CMYK in step S240.

(4) Modification 2

In the case where small dots of CMYK inks are discharged around the letter, the blur caused by the small dots of K ink should be more conspicuous because the density thereof is higher. Therefore, if the ratios of occurrence of small dots of K ink are reduced, it will favorably prevent the blur while color reproduction of other CMY inks is maintained. The conversion from the gradients into the ratios of occurrence of dots adopting such a method is as follows.

Figure 19:
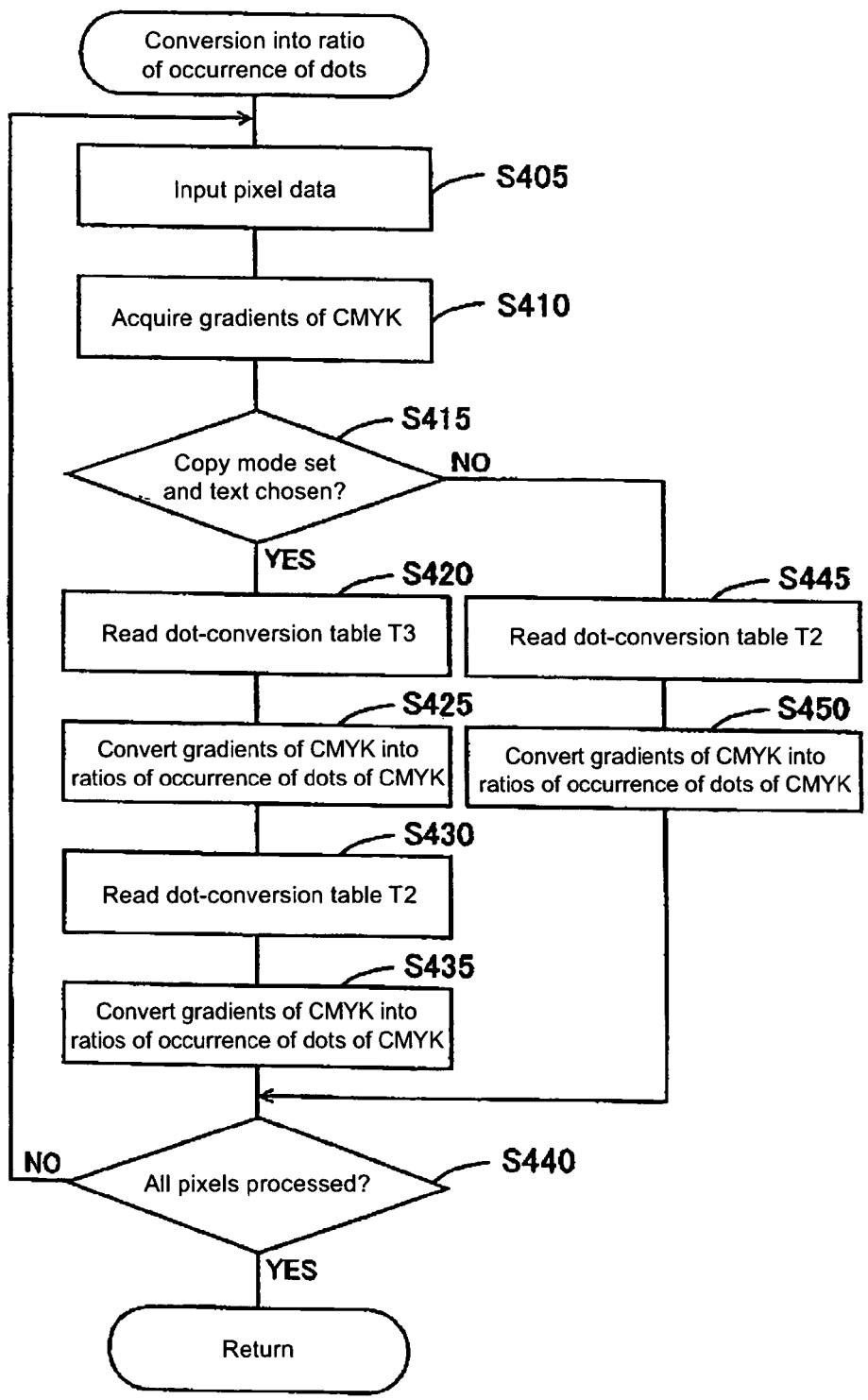
FIG. 19 is a flowchart of conversion from the ratios of occurrence of small dots into the ratios of occurrence of large dots in accordance with the present invention.

FIG. 19 is a flowchart of conversion from the gradients of CMYK into the ratios of occurrence of dots of CMYK.

In FIG. 19, the pixel data of image data in CMYK colors in which RGB gradients are converted to CMYK gradients on the basis of the color-conversion table T1 are inputted (Step S405) and the gradients of CMYK are acquired from the inputted pixel data (Step S410). Then, set information of the operating unit 60 is acquired, and it is ascertained based on such information whether the copy mode is chosen or not and whether, by the attribute-input button, text is chosen as the attribute or not by a user (Step S415). When it is ascertained that the copy mode is chosen and text is chosen as the attribute by the attribute-input button, the dot-conversion table T3 is read out (Step S420).

Figure 13:
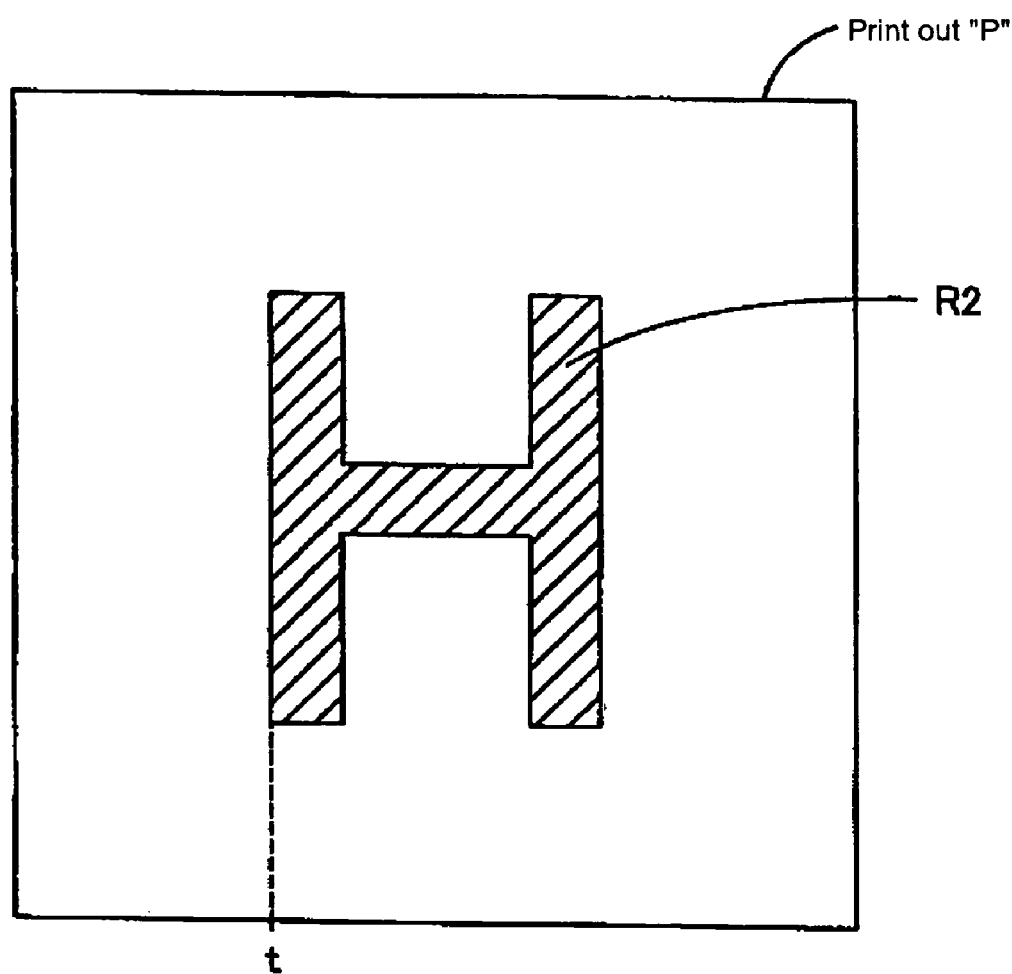
FIG. 13 is a printout of the image of the sheet of paper of FIG. 2 from the printer with a scanner function of FIG. 1, the blur of the outline of the letter reduced.

Based on this dot-conversion table T3, the gradients of K are converted into the ratios of occurrence of dots of K ink (Step S425). Then, the dot-conversion table T2 is read out (Step S430) and based on this dot-conversion table T2, the gradients of CMY are converted into the ratios of occurrence of dots of CMY ink (Step S435). By doing the above processing to all the pixels, the pixel data of the gradients of CMYK are converted into the pixel data of the ratios of occurrence of dots (Step S440). When it is ascertained that the copy mode is not chosen or text is not chosen as the attribute by the attribute-input button in Step S415, the dot-conversion table T2 is read out (Step S445) and the gradients of CMYK are converted into the ratios of occurrence of dots of CMYK based on the dot-conversion table T2 (Step S450). Accordingly, K ink is not discharged in the area R3 between the points "t0" and "t" as shown in FIG. 12. Thus, as shown in FIG. 13 the letter represented by the area R2 on the sheet of paper "P" is not blurred and the clearness or distinctness of the letter can be improved.

In the case where light-color inks (lc ink and lm ink) are adopted, from the viewpoint of holding down the ratio of occurrence of small dots of deep-color inks, the occurrence of small dots of deep-color inks (C ink and M ink) may be reduced based on the dot-conversion table T3.

(5) Conclusion

Thus, when printing text "0" taken through by the scanner unit 30, by reducing (or reducing to zero) the ratios of occurrence of small dots in a gradient range "n" or "m" of the data for printing (CMYK signals) generated from image data (RGB signals), or by converting such ratios of occurrence of small dots into the ratios of occurrence of large dots based on the weight ratio, the blur around each letter that may be caused by the small dots can be reduced, and the clearness and distinctness of each letter can be improved.

What is claimed is:

1. A printer with a scanner function printing images taken in by a scanner, comprising:
   an image data acquirer inputting image data composed of a first set of prescribed elementary colors;
   a data converter converting said inputted image data into data for printing composed of ratios of occurrence of dots of two or more dot sizes on the basis of corresponding relationship between gradational expression of said first set of elementary colors and the ratios of occurrence of dots of the two or more dot sizes of a second set of elementary colors for printing; and
   a relationship controller that reduces a selected ratio of occurrence of dots of a comparatively small dot size selected from among the ratios of occurrence of dots of the two or more dot sizes of the second set of elementary colors in a gradient range where the selected ratio of occurrence of dots of the comparatively small dot size is below a prescribed threshold value by changing said corresponding relationship in the gradient range while said inputted image data are being converted into data for printing if said image data are inputted through said scanner by said image data acquirer and the image data are of a prescribed attribute.

2. A printer with a scanner function according to claim 1, wherein said relationship controller reduces the selected ratio of occurrence of dots of the comparatively small dot size in the gradient range where the selected ratio of occurrence of dots of the comparatively small dot size is below the prescribed threshold value by changing said selected ratio of occurrence of dots of the comparatively small dot size to zero in the gradient range.

3. A printer with a scanner function according to claim 1, wherein said relationship controller reduces the selected ratio of occurrence of dots of the comparatively small dot size in the gradient range where the selected ratio of occurrence of dots of the comparatively small dot size is below the prescribed threshold value and increases a ratio of occurrence of dots of relatively larger dot size than the comparatively small dot size by converting the selected ratio of occurrence of dots of the comparatively small dot size in the gradient range into the ratio of occurrence of dots of relatively larger dot size.

4. A printer with a scanner function according to claim 3, wherein, during said conversion, said relationship controller converts the selected ratio of occurrence of dots of the comparatively small dot size into the ratios of occurrence of dots of the relatively larger dot size on the basis of the weight ratio of said comparatively small dot size to said relatively larger dot size.

5. A printer with a scanner function according to claim 1, wherein said second set of elementary colors for printing includes a light color and a deep color, and said relationship controller reduces the selected ratio of occurrence of dots of the comparatively small dot size of the two or more dot sizes of the deep color.

6. A printer with a scanner function according to claim 1, wherein said second set of elementary colors for printing includes black, and said relationship controller reduces the selected ratio of occurrence of dots of the comparatively small dot size of the two or more dot sizes of the black.

7. A printer with a scanner function according to claim 1, wherein the printer has a look-up-table-storing means storing in advance a look-up table prescribing corresponding relationship between gradational expression of said first set of elementary colors and gradational expression of the ratios of occurrence of dots of the two or more dot sizes of said second set of elementary colors;
   wherein said data converter reads out the look-up table and performs said conversion; and
   wherein said relationship controller reduces said selected ratio of occurrence of the dots of the comparatively small size by changing the corresponding relationship prescribed in the look-up table.

8. A printer with a scanner function according to claim 1, wherein said prescribed attribute of the image taken in is text.

9. A printer with a scanner function according to claim 1, wherein said attribute is received through a means of receiving instructions about attributes of images receiving an instruction as to whether said attribute of the image is text or not.

10. A printer with a scanner function according to claim 1, wherein
    the dots of the two or more dot sizes include a small dot, a medium dot, and a large dot;
    the small dot is a dot of the comparatively small dot size;
    the data converter converts the inputted image data into data for printing composed of ratios of occurrence of small dots, medium dots, and large dots; and
    the relationship controller reduces the ratio of occurrence of the small dots in the gradient range where a ratio of occurrence of the small dots is below the prescribed threshold value by changing the corresponding relationship in the gradient range.

11. A printer with a scanner function according to claim 1, wherein
    the dots of the two or more dot sizes include a small dot and a large dot;
    the small dot is a dot of the comparatively small dot size;
    the data converter converts the inputted image data into data for printing composed of ratios of occurrence of small dots and large dots; and
    the relationship controller (a) changes the corresponding relationship in the gradient range where a ratio of occurrence of the small dots is below the prescribed threshold value and (b) reduces the ratio of occurrence of the small dots in the gradient range.

12. A printer with a scanner function according to claim 1, wherein
    the corresponding relationship includes a first corresponding relationship between first gradational expression of the first set of prescribed elementary colors and second gradational expression of the second set of elementary colors for printing, and a second corresponding relationship between the second gradational expression of the second set of elementary colors for printing and the ratios of occurrence of dots of the two or more dot sizes of the second set of elementary colors for printing;
    the data converter converts first image data composed of the first set of prescribed elementary colors into second image data composed of the second set of elementary colors for printing on the basis of the first corresponding relationship; and
    the data converter converts the second image data into the data for printing composed of the ratios of occurrence of dots of two or more dot sizes on the basis of the second corresponding relationship.

13. A printer with a scanner function according to claim 1, wherein
    the first set of prescribed elementary colors has a red color, a green color, and a blue color; and
    the second set of elementary colors has a cyan color, a magenta color, a yellow color, and a black color.

14. A control method for a printer with a scanner function printing images taken in by a scanner, the control method comprising:
- a step of inputting image data composed of a first set of prescribed elementary colors;
- a step of converting said inputted image data into data for printing composed of ratios of occurrence of dots of two or more dot sizes on the basis of corresponding relationship between gradational expression of the first set of said prescribed elementary colors and the ratios of occurrence of dots of the two or more dot sizes of a second set of elementary colors for printing; and
- a step of reducing a selected ratio of occurrence of dots of a comparatively small dot size in a gradient range where the selected ratio of occurrence of dots of the comparatively small dot size is below a prescribed threshold value by changing said corresponding relationship in the gradient range while said inputted image data are being converted into data for printing if said image data are inputted through said scanner in said step of inputting the image data and the image data are of a prescribed attribute.

15. A control program product including a non-transitory computer-readable medium having a computer program stored thereon, the computer program including program instructions or commands for causing a computer to implement a function of a printer with a scanner function printing images taken in by a scanner, wherein the computer program causes the computer to implement functions comprising:
- a function of inputting image data composed of a first set of prescribed elementary colors;
- a function of converting said inputted image data into data for printing composed of ratios of occurrence of dots of two or more dot sizes on the basis of the corresponding relationship between gradational expression of the first set of said prescribed elementary colors and the ratios of occurrence of dots of the two or more dot sizes of a second set of elementary colors for printing; and
- a function of reducing a selected ratio of occurrence of dots of a comparatively small dot size in a gradient range where the selected ratio of occurrence of dots of the comparatively small dot size is below a prescribed threshold value by changing said corresponding relationship in the gradient range while said inputted image data are being converted into data for printing if said image data are inputted through said scanner by said function of inputting the image data and the image data are of a prescribed attribute.

* * * * *